US012372192B2

(12) United States Patent
Pastena et al.

(10) Patent No.: US 12,372,192 B2
(45) Date of Patent: Jul. 29, 2025

(54) DUCT FOR A FLUID TO BE TRANSPORTED, IN PARTICULAR IN A MOTOR VEHICLE

(71) Applicant: HUTCHINSON S.R.L., Rivoli (IT)

(72) Inventors: Davide Pastena, Turin (IT); Claudio Ramaro, Nichelino (IT); Nicola Moretti, Gassino (IT); Katia Rossi, Collegno (IT)

(73) Assignee: HUTCHINSON S.R.L., Rivoli (IT)

( * ) Notice: Subject to any disclaimer, the term of this patent is extended or adjusted under 35 U.S.C. 154(b) by 808 days.

(21) Appl. No.: 16/972,468

(22) PCT Filed: Jun. 5, 2019

(86) PCT No.: PCT/IB2019/054662
§ 371 (c)(1),
(2) Date: Dec. 4, 2020

(87) PCT Pub. No.: WO2019/234646
PCT Pub. Date: Dec. 12, 2019

(65) Prior Publication Data
US 2021/0231257 A1 Jul. 29, 2021

(30) Foreign Application Priority Data
Jun. 6, 2018 (IT) .................. 102018000006074

(51) Int. Cl.
F16L 53/32 (2018.01)
F01N 3/20 (2006.01)
(Continued)

(52) U.S. Cl.
CPC .......... *F16L 59/075* (2013.01); *F01N 3/2066* (2013.01); *F16L 53/32* (2018.01);
(Continued)

(58) Field of Classification Search
CPC ......... F16L 59/075; F16L 53/32; F16L 53/38; F01N 3/2066; F01N 2470/24; F01N 2470/26; F01N 2610/148
(Continued)

(56) References Cited

U.S. PATENT DOCUMENTS 3,269,422 A * 8/1966 Matthews ................. F16L 9/18
165/172
3,526,086 A * 9/1970 Morgan .................. F16L 11/22
138/132
(Continued)

FOREIGN PATENT DOCUMENTS

DE 102011053053 A1 2/2013
EP 2653770 A1 10/2013
(Continued)

OTHER PUBLICATIONS

International Search Report and Written Opinion for PCT/IB2019/054662, mailed Sept. 2, 2019.

*Primary Examiner* — David R Deal
(74) *Attorney, Agent, or Firm* — Merchant & Gould P.C.

(57) ABSTRACT

A duct includes an inner tube configured to have fluid flow through to be transported and an outer tube surrounding the inner tube. The outer tube defines, in its interior, a plurality of auxiliary channels, which extend in the longitudinal direction of the outer tube and are designed to contain or have a further auxiliary fluid flow through, which is configured to thermally interact with the fluid to be transported.

17 Claims, 2 Drawing Sheets

(51) Int. Cl.
*F16L 53/38* (2018.01)
*F16L 59/075* (2006.01)

(52) U.S. Cl.
CPC .......... *F16L 53/38* (2018.01); *F01N 2470/24* (2013.01); *F01N 2470/26* (2013.01); *F01N 2610/02* (2013.01); *F01N 2610/1486* (2013.01)

(58) Field of Classification Search
USPC .................................................. 138/111, 149
See application file for complete search history.

(56) References Cited

U.S. PATENT DOCUMENTS

| | | | | |
|---|---|---|---|---|
| 4,036,617 A * | 7/1977 | Leonard | ............ | F16L 7/00 |
| | | | | 62/50.7 |
| 4,432,395 A * | 2/1984 | Beune | ............ | F16L 47/10 |
| | | | | 138/155 |
| 4,570,680 A | 2/1986 | Ratti | | |
| 6,024,135 A * | 2/2000 | Nobileau | ............ | F16L 11/083 |
| | | | | 138/135 |
| 6,634,388 B1 * | 10/2003 | Taylor | ............ | B29C 63/34 |
| | | | | 138/104 |
| 6,786,241 B2 * | 9/2004 | Bedner | ............ | F16L 59/07 |
| | | | | 138/121 |
| 7,861,745 B2 * | 1/2011 | Adamson | ............ | F42D 1/10 |
| | | | | 138/116 |
| 7,975,727 B2 * | 7/2011 | Adler | ............ | F17D 1/082 |
| | | | | 138/104 |
| 8,857,474 B2 * | 10/2014 | Stokes | ............ | F16L 53/32 |
| | | | | 138/116 |
| 10,788,157 B2 * | 9/2020 | Smahl | ............ | F16L 59/021 |
| 11,428,055 B2 * | 8/2022 | Duan | ............ | E21B 17/203 |
| 2013/0277959 A1 * | 10/2013 | Barthel | ............ | F16L 53/32 |
| | | | | 285/41 |
| 2015/0053293 A1 * | 2/2015 | Ophaug | ............ | F16L 9/123 |
| | | | | 138/140 |

FOREIGN PATENT DOCUMENTS

| | | |
|---|---|---|
| EP | 2666985 A1 | 11/2013 |
| EP | 3203046 A1 | 8/2017 |

* cited by examiner

DUCT FOR A FLUID TO BE TRANSPORTED, IN PARTICULAR IN A MOTOR VEHICLE This application is a National Stage Application of International Application No. PCT/IB2019/054662, filed Jun. 5, 2019, which claims benefit of Ser. No. 102018000006074, filed Jun. 6, 2018 in Italy and which applications are incorporated herein by reference. To the extent appropriate, a claim of priority is made to each of the above-disclosed applications.

TECHNICAL FIELD

The present invention relates to a duct for a fluid to be transported, in particular in a motor vehicle.

TECHNICAL BACKGROUND

In particular, in the automotive field, ducts for a fluid to be transported are known, for example in a selective catalytic reduction or SCR system.

According to the prior art, this type of duct comprises an inner tube configured to be flown through by the fluid to be transported and an outer tube surrounding the inner tube and, hence, creating a covering sheath. This duct is described, for example, in document EP 2 666 985, wherein there is a plurality of inner grooves in the covering sheath. Furthermore, in the aforesaid document, the duct has a device for heating the fluid to be transported, in particular a heating resistor wire, with which the inner tube is provided.

However, this type of ducts is affected by some drawbacks.

One drawback lies in the fact that the walls defining the groove tend to collapse during the duct manufacturing process, in particular during the thermoforming of the duct. Furthermore, the resistive wires, since they are not intimately in contact with the sheath, can move from their initial position and create conditions of lack of homogeneity in the heating.

SUMMARY OF THE INVENTION

An object of the present invention is to provide a duct which is capable of solving the drawbacks of the prior art.

According to the present invention, this object is reached by means of a duct having the technical features set forth in the appended independent claim.

In particular, these technical features allow the duct to have a better resistance, in particular in case of manufacturing by means of thermoforming or, anyway, by means of processes involving a heating of the outer tube at high temperatures.

A further advantage lies in the fact that the duct can adjust to different fluid transportation systems involving different use needs. In particular, the auxiliary channels can be used to obtain, relative to the environment on the outside of the duct, an effective thermal insulation of the fluid to be transported, which is going to flow in the inner tube, for example by closing them at their axial ends and containing air. Alternatively, the auxiliary channels can be used to heat the fluid to be transported, for example by causing the auxiliary channels to be flown through by an auxiliary fluid suited to carry out a heat exchange with the fluid to be transported. In this case, the auxiliary channels can be axially open so as to allow the auxiliary fluid to flow through them.

The appended claims are an integral part of the technical teachings provided in the following detailed description concerning the present invention.

Further features and advantages of the present invention will be best understood upon perusal of the following detailed description, which is provided by way of example and is not limiting, with reference, in particular, to the accompanying drawings, which are briefly described below.

DETAILED DESCRIPTION OF THE INVENTION

Figure 1:
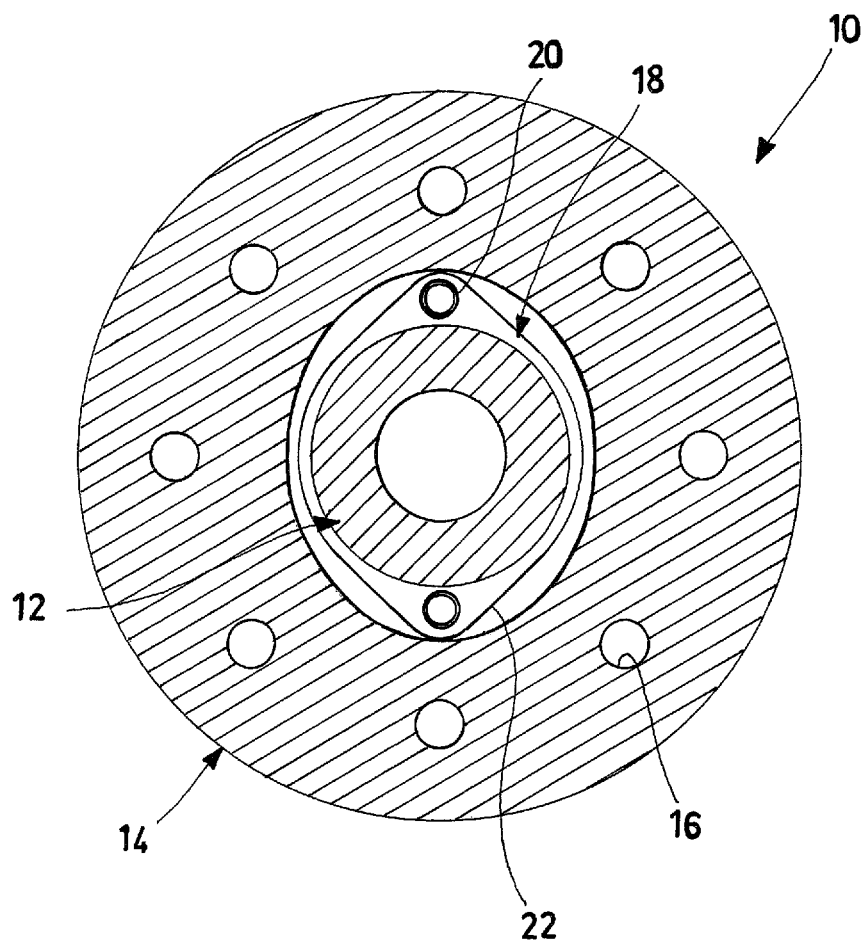
FIG. 1 is a cross sectional view of a duct according to an exemplary embodiment of the present invention.
Figure 2:
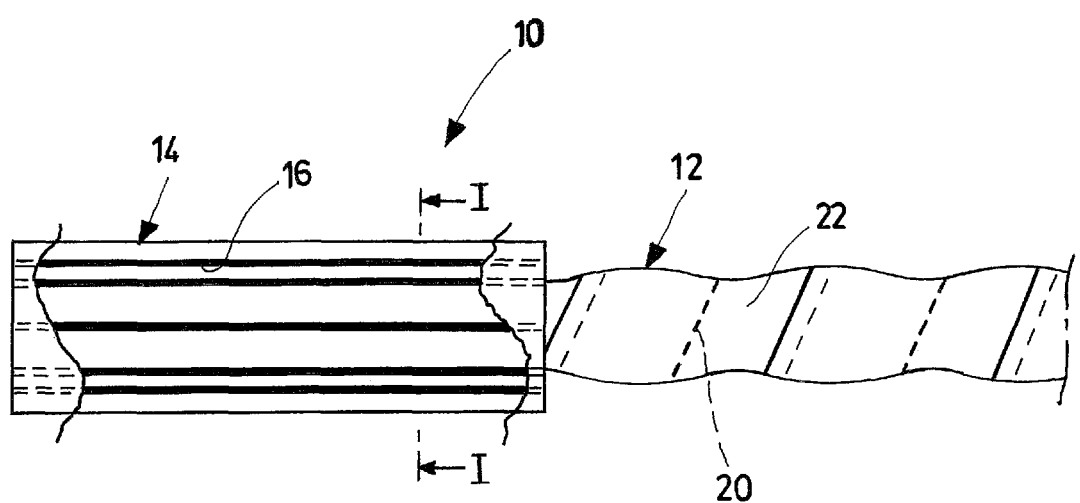
FIG. 2 is a schematic side view, with a partial cross section and in a cutaway drawing, of the duct shown in FIG. 1.

With reference to the accompanying figures, 10 indicates, as a whole, a duct for a fluid to be transported and which is manufactured according to an exemplary embodiment of the present invention.

For example, the duct 10 can be used in a motor vehicle. In particular, the duct 10 can be used in a selective catalytic reduction system or SCR, in a battery cooling system or in a water injection system.

The duct 10 comprises an inner tube 12, which is configured to be flown through by the fluid to be transported. Furthermore, the duct 10 comprises an outer tube 14 surrounding the inner tube 12.

Therefore, as it can be directly derived from the above in a non-ambiguous manner, the inner tube 12 and the outer tube 14 create a first and a second tube, respectively, which are structurally distinct from one another. The outer tube 14 defines, in its interior, a plurality of auxiliary channels 16, which extend in the longitudinal direction of the outer tube 14 and are designed to contain or be flown through by a further auxiliary fluid, which is suited to thermally interact with the fluid to be transported in the inner tube 12.

The outer tube 14 is directly extruded around the inner tube 12. In other words, the outer tube 14 creates a sheath, which is directly manufactured through extrusion around the inner tube 12 in a continuous process, thus preventing the outer tube 14 from being subsequently fitted on the inner tube 12, which would lead to high manufacturing costs and long manufacturing times.

In particular, the auxiliary channels 16 are situated in the interior of the outer tube 14. These auxiliary channels 16 are obtained in an intermediate position between the radially inner wall and the radially outer wall of the outer tube 14.

Therefore, as it can be directly derived from the above in a non-ambiguous manner, the auxiliary channels 16 are arranged into the thickness of the outer tube 14. In other words, the auxiliary channels 16 have a closed cross section defined in the interior of the outer tube 14; in particular, these auxiliary channels 16 are exclusively delimited by inner walls obtained into the thickness of the outer tube 14.

Therefore, the presence of the auxiliary channels 16 does not lead to a structural weakening of the walls of the outer tube 14, as opposed to what happens in the prior art. In addition, the structure of the duct 10 allows it to adjust to different and various modes of use, in particular due to the versatility of use of the auxiliary channels 16.

According to an exemplary embodiment of the present invention, the auxiliary fluid can be used to thermally insulate the fluid to be transported from the external environment. For example, the auxiliary fluid can be air. Alternatively, the auxiliary fluid is capable of delivering heat to the fluid to be transported by means of heat exchange through the walls of the inner tube 12 and of the outer tube 14.

According to an exemplary embodiment of the present invention, the auxiliary channels 16 are arranged around the inner tube 12. In particular, the auxiliary channels 16 are arranged substantially circumferentially around the inner tube 12. The auxiliary channels 16 preferably are substantially angularly equally spaced apart one from the other.

According to an exemplary embodiment of the present invention, the cross section of the auxiliary channels 16 is substantially circular.

According to an exemplary embodiment of the present invention, the outer tube 14 is made of an elastomer, in particular a thermoplastic elastomer and, more in particular, a vulcanized thermoplastic elastomer or TPV.

In particular, the assembly consisting of the inner tube 12 and the outer tube 14 forms a flexible duct 10.

According to an exemplary embodiment of the present invention, the inner tube 12 is provided with a heating device 18, which is configured to heat the fluid to be transported. In particular, the heating device 18 includes a resistive element, for example a resistive wire 20, which extends on the outside along the inner tube 12. More in particular, the resistive wire 20 is wound around the inner tube 12.

The resistive wire 20 is preferably carried by a thin layer or band 22, which surrounds the inner tube 12 and, in particular, is radially situated between the inner tube 12 and the outer tube 14.

In an exemplary embodiment of the present invention, the diameter of the auxiliary channels 16 ranges from 0.1*D1 to 0.4*D1, wherein D1 is the inner diameter of the outer tube 14.

In an exemplary embodiment of the present invention, the center of the auxiliary channels 16 is positioned on a circumference with a diameter ranging from 0.85*(D1+S) to 1.15*(D1+S), wherein D1 is the inner diameter of the outer tube 14 and S is the thickness of the outer tube 14; the thickness S being equal to (D2−D1)/2, wherein D2 is the outer diameter of the outer tube 14.

As already mentioned above, the duct 10 can be used in a fluid transportation system.

According to an exemplary embodiment of the present invention, the fluid transportation system comprises the duct 10 and a fluid source, which is configured to provide the fluid to be transported. Said fluid source is connected to the inner tube 12 of the duct 10.

As already mentioned above, the duct 10 has a versatility that allows it to be used in systems of different types.

According to an embodiment of the present invention, the auxiliary channels 16 can be closed at their axial ends, so as to create a thermal insulation of the fluid to be transported, which flows through the inner tube 12. In this case, the fluid acting as thermal insulator preferably is air.

According to an alternative embodiment, the system can include an auxiliary fluid source, which is configured to provide an auxiliary fluid and is connected to the axial ends of the auxiliary channels 16 of the outer tube 14. The axial ends of the auxiliary channels 16 are preferably open, so as to permit a circulation of the auxiliary fluid through them. The auxiliary fluid can be selected with properties that are such as to allow for a heating or an insulation of the fluid to be transported in the inner tube 12. Therefore, the thermal functionalities of the duct 10 can be adjusted depending on the performances to be given to the system on which it is installed.

According to an exemplary embodiment, the system can be configured for a selective catalytic reduction or SCR, in which the fluid to be transported typically is a urea solution and the auxiliary fluid can be the air contained in the auxiliary channels 16. In this manner, the heating of the urea solution is obtained in an effective manner through the cooperation between the heating device 18 and the thermal insulation created by the air contained in the auxiliary channels 16.

According to a variant of embodiment, in the selective catalytic reduction or SCR system, the heating device 18 is omitted and the auxiliary fluid can be a hot or heated fluid circulating in the auxiliary channels 16. In this manner, the heating of the urea solution is obtained due to the circulation of auxiliary fluid flowing through the auxiliary channels 16.

In the embodiment shown by way of non-limiting example, they preferably are substantially concentric.

Naturally, the principle of the present invention being set forth, embodiments and implementation details can be widely changed relative to what described above and shown in the drawings as a mere way of non-limiting example, without in this way going beyond the scope of protection provided by the accompanying claims.

The invention claimed is:

1. A duct for a fluid to be transported in a motor vehicle; said duct comprising:
   an inner tube, which is arranged on an inside of the duct and is configured to have said fluid to be transported flow through, and
   an outer tube made of an elastomer, which is arranged radially outside and surrounding the inner tube and is extruded around said inner tube;
   wherein the inner tube and the outer tube are a first tube and a second tube, the first tube and the second tube being structurally distinct from each other;
   wherein the inner tube and the outer tube form a flexible conduit;
   wherein the outer tube defines, in an interior, a plurality of auxiliary channels made in an intermediate position between a radially inner wall and a radially outer wall of said outer tube; said auxiliary channels being formed within a thickness of the outer tube and said auxiliary channels being exclusively defined by material of the outer tube; said auxiliary channels extending in a longitudinal direction of said outer tube and being configured to contain or have flowing through an auxiliary fluid, which is adapted to thermally interact with said fluid to be transported and to thermally insulate said fluid to be transported relative to an external environment.

2. The duct according to claim 1, wherein said auxiliary fluid is air.

3. The duct according to claim 1, wherein said auxiliary channels are arranged around said inner tube.

4. The duct according to claim 3, wherein said auxiliary channels are arranged substantially circumferentially around said inner tube.

5. The duct according to claim 4, wherein said auxiliary channels are arranged substantially angularly equally spaced apart from one another.

6. The duct according to claim 1, wherein a cross section of said auxiliary channels is substantially circular.

7. The duct according to claim 1, wherein said elastomer is a thermoplastic elastomer.

8. The duct according to claim 7, wherein said thermoplastic elastomer is a vulcanized thermoplastic elastomer or TPV.

9. The duct according to claim 1, wherein said inner tube is provided with a heating device, which is configured to heat said fluid to be transported.

10. The duct according to claim 9, wherein said heating device comprises at least one resistive element, which extends along said inner tube.

11. The duct according to claim 1, wherein a diameter of said auxiliary channels ranges from 0.1*D1 to 0.4*D1, wherein D1 is an inner diameter of said outer tube.

12. The duct according to claim 1, wherein a centre of said auxiliary channels is positioned on a circumference with a diameter ranging from 0.85*(D1+S) to 1.15*(D1+S), wherein D1 is an inner diameter of said outer tube and S is a thickness of said outer tube; said thickness S being equal to (D2−D1)/2, wherein D2 is an outer diameter of said outer tube.

13. A fluid transportation system comprising:
   a duct according to claim 1; and
   a fluid source, which is configured to supply the fluid to be transported and is fluidically connected to said inner tube of said duct.

14. The system according to claim 13, wherein said auxiliary channels are closed at axial ends; said auxiliary fluid being air.

15. The system according to claim 13 and further comprising an auxiliary fluid source, which is configured to provide the auxiliary fluid and is fluidically connected to said auxiliary channels of said outer tube.

16. A motor vehicle comprising a system according to claim 13.

17. A method of manufacturing a duct for a fluid to be transported in a motor vehicle; the method comprising:
   arranging an inner tube on an inside of the duct, the inner tube being configured to have said fluid to be transported flow through;
   extruding an outer tube made of an elastomer radially outward and surrounding the inner tube and forming a flexible conduit;
   wherein the inner tube and the outer tube are a first tube and a separate second tube, the first tube and the second tube being structurally distinct from each other;
   forming a plurality of auxiliary channels made in an intermediate position between a radially inner wall and a radially outer wall of said outer tube within a thickness of the outer tube; said auxiliary channels being exclusively defined by material of the outer tube; said auxiliary channels extending in a longitudinal direction of said outer tube and being configured to contain or have flowing through a further auxiliary fluid, which is adapted to thermally interact with said fluid to be transported and to thermally insulate said fluid to be transported relative to an external environment.

* * * * *